United States Patent [19]

Hiratani et al.

[11] Patent Number: 5,543,442
[45] Date of Patent: Aug. 6, 1996

[54] OCULAR LENS MATERIAL

[75] Inventors: Haruyuki Hiratani; Kazuhiko Nakata, both of Nagoya; Shoji Ichinohe, Matsuida-machi; Toshio Yamazaki, Matsuida-machi; Hideto Kato, Matsuida-machi, all of Japan

[73] Assignees: Menicon Co., Ltd., Nagoya; Shin-Etsu Chemical Co., Ltd., Tokyo-to, both of Japan

[21] Appl. No.: 274,293

[22] Filed: Jul. 12, 1994

[30] Foreign Application Priority Data

Jul. 13, 1993 [JP] Japan .................................. 5-173308
Sep. 2, 1993 [JP] Japan .................................. 5-218560
Apr. 1, 1994 [JP] Japan .................................. 6-065054

[51] Int. Cl.$^6$ ..................................................... H01H 9/00
[52] U.S. Cl. .......................... 523/107; 523/106; 528/353; 623/6
[58] Field of Search .............................. 528/353; 523/107, 523/106; 361/160 R, 160 H; 623/6

[56] References Cited

U.S. PATENT DOCUMENTS

| | | |
|---|---|---|
| 4,681,585 | 7/1987 | Sayano et al. . |
| 4,880,895 | 11/1989 | Higashi et al. ........................ 528/173 |
| 4,955,900 | 9/1990 | Higashi et al. ............................ 623/6 |
| 5,041,133 | 8/1991 | Sayano et al. . |
| 5,049,156 | 9/1991 | Higashi et al. ............................ 623/6 |
| 5,093,453 | 3/1992 | St. Clair et al. . |
| 5,260,352 | 11/1993 | Kawakami . |

FOREIGN PATENT DOCUMENTS

| | | |
|---|---|---|
| 0345810 | 12/1989 | European Pat. Off. . |
| 0426088 | 5/1991 | European Pat. Off. . |
| 0556828 | 8/1993 | European Pat. Off. . |
| WO94/14874 | 7/1994 | WIPO . |

OTHER PUBLICATIONS

Database WPI, Derwent Publications Ltd., London, GB; AN 91–061339 & JP–A–3 009 747, 01/1991, Abstract.
Databse WPI, Derwent Publications Ltd., London, GB; AN 87–112126 & JP–A–62 057 421, 03/1987, Abstract.

Primary Examiner—Edward J. Cain
Attorney, Agent, or Firm—Armstrong, Westerman, Hattori, McLeland, & Naughton

[57] ABSTRACT

A transparent ocular lens material comprising a condensation polymer prepared by the condensation polymerization of a monomer mixture comprising (A) an aromatic tetracarboxylic acid dianhydride and (B) at least one diamino compound selected from (a) a silicon-containing diamine, (b) a diamino-substituted benzene and (c) a diamino-substituted diphenyl. The ocular lens material is excellent in transparency, having high oxygen permeability and moreover, excellent in heat resistance, ultraviolet-ray absorbing property and forming and processing property. Therefore, the ocular lens material can be suitably used in contact lenses, intraocular lenses, and the like.

4 Claims, No Drawings

OCULAR LENS MATERIAL

BACKGROUND OF THE INVENTION

The present invention relates to a transparent ocular lens material, and more particularly to an ocular lens material having excellent transparency, high oxygen permeability and high heat resistance (high glass transition temperature), and moreover having excellent ultraviolet-ray absorbing property and excellent forming and processing property, which is suitable for use as contact lenses, intraocular lenses, and the like.

Conventionally, for an ocular lens, especially for a contact lens, excellent oxygen permeability has been required as one of important physical properties because there is a necessity to supply a cornea with sufficient amount of oxygen through the ocular lens so that functions of metabolism of corneal tissue would not be lowered.

Also, for an intraocular lens, heat resistance has been required as one of important physical properties so that the intraocular lens can have sufficient heat resistance during autoclaved sterilization of the intraocular lens before inserting the intraocular lens into an eye.

Furthermore, a contact lens or an intraocular lens, in which an ultraviolet-ray absorbing agent is used, has been employed in order to avoid that bad influences owing to ultraviolet rays are exerted upon eyes. However, the contact lens or the intraocular lens, in which the ultraviolet-ray absorbing agents is used, especially the contact lens having high oxygen permeability, has a problem in safety that the ultraviolet-ray absorbing agent easily elutes from the lens.

Accordingly, it is desired that an ocular lens material which has transparency, improved oxygen permeability and heat resistance, and is excellent in ultraviolet-ray absorbing property is developed without using an ultraviolet-ray absorbing agent.

An object of the present invention is to provide an ocular lens material having excellent transparency and high oxygen permeability.

Another object of the present invention is to provide an ocular lens material having excellent forming and processing property as well as high heat resistance and excellent ultraviolet-ray absorbing property.

These and other objects of the present invention will become apparent from the description hereinafter.

SUMMARY OF THE INVENTION

In accordance with the present invention, there is provided a transparent ocular lens material comprising a condensation polymer prepared by the condensation polymerization of a monomer mixture comprising
(A) an aromatic tetracarboxylic acid dianhydride represented by the general formula (I):

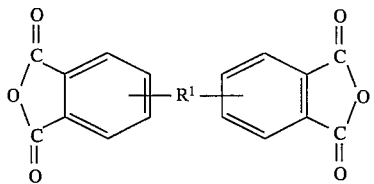
(I)

wherein $R^1$ is -O-, -CO-, -SO$_2$-, -CH$_2$-, -C(CH$_3$)$_2$-, -C(CF$_3$)$_2$- or a group represented by the general formula:

$$-O-\underset{}{\bigcirc}-R^2-\underset{}{\bigcirc}-O-$$

in which $R^2$ is -C(CH$_3$)$_2$- or -C(CF$_3$)$_2$- and
(B) at least one diamino compound selected from (a) a silicon-containing diamine represented by the general formula (II):

$$H_2N-R^3-NH_2 \qquad (II)$$

wherein $R^3$ is a group represented by the general formula:

$$-(CH_2)_l-(SiO)_m-Si-(CH_2)_n-$$
with CH$_3$ groups on Si in which l is an integer of 1 to 3, m is an integer of 1 to 15 and n is an integer of 1 to 3, a group represented by the general formula:

(phenyl)-O-(SiO)$_p$-(phenyl) with CH$_3$ groups on Si in which p is an integer of 1 to 10, a group represented by the general formula:

(phenyl)-O-(CH$_2$)$_q$-(SiO)$_r$-Si-(CH$_2$)$_s$-O-(phenyl) with CH$_3$ groups on Si in which q is an integer of 1 to 3, r is an integer of 1 to 10 and s is an integer of 1 to 3, a group represented by the general formula:

(phenyl)-(SiO)$_t$-Si-(phenyl) with CH$_3$ groups on Si in which t is an integer of 1 to 10, or a group represented by the general formula:

-(CH$_2$)$_u$-Si(CH$_3$)$_2$-(phenyl)-Si(CH$_3$)$_2$-(CH$_2$)$_v$- in which u is an integer of 1 to 3 and v is an integer of 1 to 3;
(b) a diamino-substituted benzene represented by the general formula (III):

$$\underset{R^5 \ R^6 \ R^7}{\underset{|}{H_2N}\text{-benzene-}\underset{|}{NH_2}} \text{ with } R^4 \qquad (III)$$

wherein $R^4$, $R^5$, $R^6$ and $R^7$ are the same or different and each is hydrogen atom or an alkyl group having 1 to 5 carbon atoms and (c) a diamino-substituted diphenyl represented by the general formula (IV):

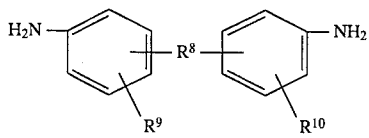

wherein $R^8$ is $-C(CH_3)_2-$, $-C(CF_3)_2-$, $-O-$, a group represented by the formula:

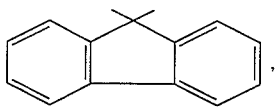

a group represented by the general formula:

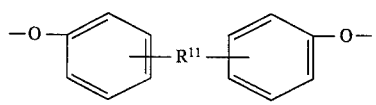

in which $R^{11}$ is $-SO_2-$, $-C(CH_3)_2-$ or $-C(CF_3)_2-$, or a direct bond, and $R^9$ and $R^{10}$ are the same or different and each is an alkyl group having 1 to 3 carbon atoms, a fluoroalkyl group having 1 to 3 carbon atoms, hydrogen atom, hydroxyl group or carboxyl group.

DETAILED DESCRIPTION

The transparent ocular lens material of the present invention comprises, as mentioned above, a condensation polymer prepared by the condensation polymerization of a monomer mixture comprising (A) an aromatic tetracarboxylic acid dianhydride represented by the general formula (I):

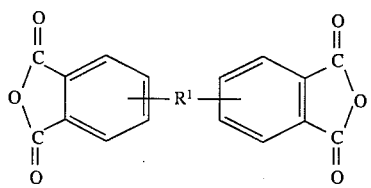

wherein $R^1$ is $-O-$, $-CO-$, $-SO_2-$, $-CH_2-$, $-C(CH_3)_2-$, $-C(CF_3)_2-$ or a group represented by the general formula:

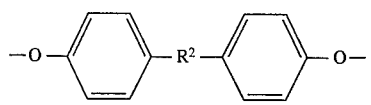

in which $R^2$ is $-C(CH_3)_2-$ or $-C(CF_3)_2-$ and (B) at least one diamino compound selected from (a) a silicon-containing diamine represented by the general formula (II):

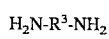

$H_2N-R^3-NH_2$      (II)

wherein $R^3$ is a group represented by the general formula:

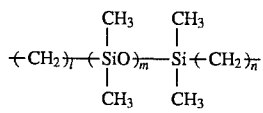

in which l is an integer of 1 to 3, m is an integer of 1 to 15 and n is an integer of 1 to 3, a group represented by the general formula:

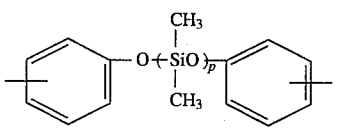

in which p is an integer of 1 to 10, a group represented by the general formula:

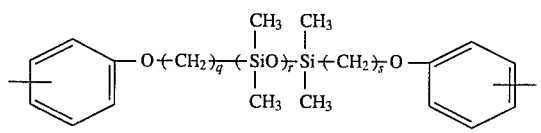

in which q is an integer of 1 to 3, r is an integer of to 10 and s is an integer of 1 to 3, a group represented by the general formula:

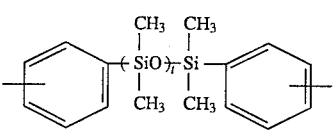

in which t is an integer of 1 to 1 0, or a group represented by the general formula:

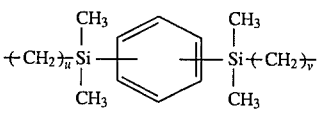

in which u is an integer of 1 to 3 and v is an integer of 1 to 3;

(b) a diamino-substituted benzene represented by the general formula (III):

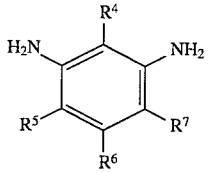

wherein $R^4$, $R^5$, $R^6$ and $R^7$ are the same or different and each is hydrogen atom or an alkyl group having 1 to 5 carbon atoms and (c) a diamino-substituted diphenyl represented by the general formula (IV):

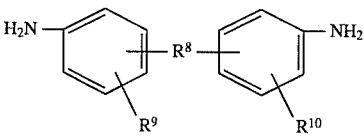

wherein $R^8$ is $-C(CH_3)_2-$, $-C(CF_3)_2-$, $-O-$, a group represented by the formula:

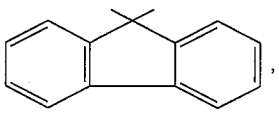

a group represented by the general formula:

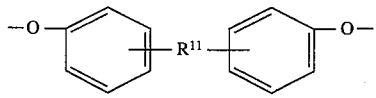

in which $R^{11}$ is $-SO_2-$, $-C(CH_3)_2-$ or $-C(CF_3)_2-$, or a direct bond, and $R^9$ and $R^{10}$ are the same or different and each is an alkyl group having 1 to 3 carbon atoms, a fluoroalkyl group having 1 to 3 carbon atoms, hydrogen atom, hydroxyl group or carboxyl group.

The aromatic tetracarboxylic acid dianhydride represented by the general formula (I) can be used alone or in an admixture thereof.

In order to obtain an ocular lens material which is more excellent in transparency, a compound represented by the general formula:

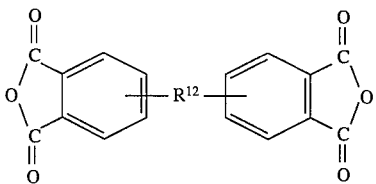

wherein $R^{12}$ is $-C(CH_3)_2-$, $-C(CF_3)_2-$, a group represented by the formula:

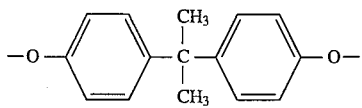

or a group represented by the formula:

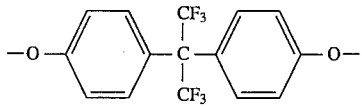

is preferably used as the aromatic tetracarboxylic acid dianhydride.

As the silicon-containing diamine which is one of the diamino compounds, a compound represented by the general formula (II) is used.

As to $R^3$ in the general formula (II), it is not preferable that each of l, n, q, s, u and v is an integer of more than 3, that m is an integer of more than 15, and that each of p, r and t is an integer of more than 10, because when the ocular lens material prepared from the condensation polymer is formed into a lens, the shape stability of the obtained lens is apt to be lowered. Moreover, as to $R^3$ in the general formula (II), it is preferable that m is an integer of 1 to 10.

Typical examples of the silicon-containing diamine are, for instance, 1,3-bis(3-aminopropyl)-1,1,3,3-tetramethyldisiloxane, 1,4-bis(3-aminopropyldimethylsilyl)benzene, 1,3-bis(2-aminoethyl)-1,1,3,3-tetramethyldisiloxane, 1,3-bis(aminomethyl)-1,1,3,3-tetramethyldisiloxane, di(p-aminophenoxy)dimethylsilane, and the like, and they can be used alone or in an admixture thereof.

As the diamino-substituted benzene which is one of the diamino compounds, a compound represented by the general formula (III) is used.

As to $R^4$, $R^5$, $R^6$ and $R^7$ in the general formula (III), it is not preferable that the number of carbon atoms in an alkyl group is more than 5, because reactivity of the above-mentioned aromatic tetracarboxylic acid dianhydride with the diamino-substituted benzene becomes low and the condensation polymer having a sufficient weight average molecular weight is hardly obtained.

Typical examples of the diamino-substituted benzene are, for instance, 2,4-diamino-1,3, 5-trimethylbenzene, 2,4-diamino-1,3,5-triethylbenzene, 2,4-diamino-1,3,5-tri-n-propylbenzene, 2,4-diamino-1,3,5 -tri-i-propylbenzene, 3,5-diaminotoluene, 3,5-diamino-o-xylene, 2,5-diamino-m-xylene, and the like, and they can be used alone or in an admixture thereof.

As the diamino-substituted diphenyl which is one of the diamino compounds, a compound represented by the general formula (IV) is used.

As to $R^9$ and $R^{10}$ in the general formula (IV), it is not preferable that each number of carbon atoms of an alkyl group and a fluoroalkyl group is more than 3, because reactivity of the above-mentioned aromatic tetracarboxylic acid dianhydride with the diamino-substituted diphenyl becomes low and the condensation polymer having a sufficient weight average molecular weight is hardly obtained.

Typical examples of the diamino-substituted diphenyl are, for instance, 2,2-bis(aminohydroxyphenyl)hexafluoropropane represented by the formula:

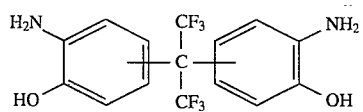

such as 2,2-bis(3-amino-4-hydroxyphenyl)hexafluoropropane, 2,2-bis(aminomethylphenyl)hexafluoropropane represented by the formula:

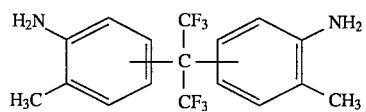

such as 2,2-bis(3-amino-4-methylphenyl)hexafluoropropane, 2,2-bis(trifluoromethyl)benzidine represented by the formula:

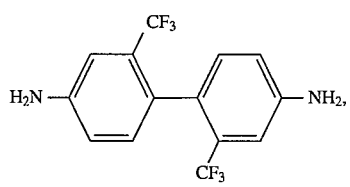

9,9-bis(4-aminophenyl)fluorene represented by the formula:

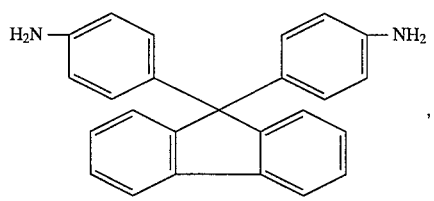

2,2-bis(3-amino-4-carboxyphenyl)hexafluoropropane, 2,2-bis(3-amino-4-ethylphenyl)hexafluoropropane, 2,2'-bis(trifluoroethyl) benzidine, a compound represented by the formula:

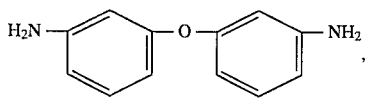

a compound represented by the formula:

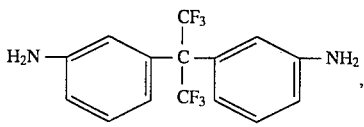

a compound represented by the formula:

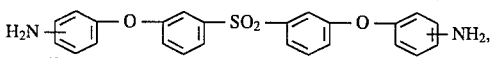

a compound represented by the formula:

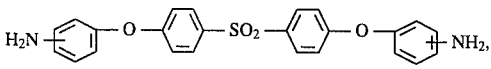

a compound represented by the formula:

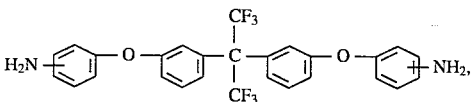

and the like, and they can be used alone or in an admixture thereof.

It is desired that the molar ratio of the aromatic tetracarboxylic acid dianhydride/the diamino compound is at least 30/70, preferably at least 40/60, more preferably at least 45/55, and that the molar ratio is at most 70/30, preferably at most 60/40, more preferably at most 55/45. When the molar ratio is less than the above lower limit and exceeds the above upper limit, there is a tendency that a weight average molecular weight of the obtained condensation polymer becomes low and sufficient strength would not be imparted to the ocular lens material. Moreover, in the present invention, it is more preferable that the number of moles of the aromatic tetracarboxylic acid dianhydride is nearly equal to that of the diamino compound, and especially, the number of moles of the aromatic tetracarboxylic acid dianhydride is equal to that of the diamino compound from the viewpoint that the reaction of the aromatic tetracarboxylic acid dianhydride with the diamino compound is a condensation polymerization reaction.

In the present invention, at least one diamino compound selected from the silicon-containing diamine, the diamino-substituted benzene and the diamino-substituted diphenyl is used. It is desired that the molar ratio of at least one of the diamino-substituted benzene and the diamino-substituted diphenyl/the silicon-containing diamine is at least 70/30, and the molar ratio is at most 100/0, because when the amount of at least one of the diamino-substituted benzene and the diamino-substituted diphenyl is too small, there are tendencies that heat resistance and forming and processing property of the obtained condensation polymer become low, and oxygen permeability of the ocular lens material prepared from the condensation polymer becomes low.

As a method for preparing the condensation polymer (hereinafter also referred to as polyimide), which is used in the ocular lens material of the present invention, from the aromatic tetracarboxylic acid dianhydride and the diamino compound, there can be cited, for instance, a method comprising polymerizing a monomer mixture comprising the aromatic tetracarboxylic acid dianhydride and the diamino compound in an organic polar solvent at a temperature of from room temperature to 80° C. to give a polyamide acid, charging a mold with the organic polar solvent solution of the polyamide acid to form an ocular lens having a desired shape, and evaporating and removing the organic polar solvent from the ocular lens in the air or in an inert gas at a temperature of from 50° to 350° C. under atmospheric pressure or reduced pressure, and at the same time dehydrating the polyamide acid for its ring-closure to give a polyimide; a method comprising adding a benzene solution of pyridine and acetic anhydride to the organic polar solvent solution of the polyamide acid to give a mixture, heating the mixture to remove the organic polar solvent from the mixture and conduct the mixture to imidation to give a polyimide; and the like.

Moreover, in the former method cited as a method for preparing the polyimide, it is also possible that the polyamide acid is isolated by reprecipitation and then the isolated polyamide acid is dehydrated for its ring-closure by heating or using give an imidation agent to give a polyimide. Furthermore, it is possible that a solution, which is obtained after the preparation of the polyamide acid, is heated for its imidation in situ to a temperature of at least 100° C. to give a precipitate from the solution and the precipitate is filtrated and washed to give a polyimide.

As the above organic polar solvent, an amide-type organic polar solvent such as N,N-dimethylformamide or N, N-dimethylacetamide can be preferably exemplified, and they can be used alone or in an admixture thereof. Moreover, among the organic polar solvents, a compound having a boiling point of at most 170° C. such as N,N-dimethylacetamide can be more preferably used.

Also, the amide-type organic polar solvent such as N,N-dimethylacetoamide is particularly preferably used in the present invention because a resulting polyimide is not colored although a resulting polyimide is colored when N-methyl-2-pyrrolidone is used. The reason why the resulting polyimide is not colored is that the amide-type organic polar solvent is evaporated before its decomposition owing to its low boiling point when the polyamide acid solution is heated and the polyamide acid is dehydrated for ring-closure to give a polyimide.

It is preferable to avoid the use of N-methyl-2-pyrrolidone as the organic polar solvent. The reason is that, as mentioned above, N-methyl-2-pyrrolidone is partially decomposed when the polyamide acid solution is heated and the polyamide acid is dehydrated for ringclosure to give a polyimide and thereby the remained decomposition products show dark brown color and the resulting polyimide is colored yellow brown. However, when the polyamide acid is prepared by using N-methyl-2-pyrrolidone as a solvent for polymerization, and the resulting polyamide acid solution is added to a poor solvent for the polyamide acid such as water to reprecipitate the polyamide acid, and the imidation of the reprecipitated polyamide acid is carried out in the absence of the solvent for polymerization, or when the polyamide acid is re-dissolved in other preferred solvent to carry out the imidation of the polyamide acid, it is possible to remove an evil influence such that N-methyl-2-pyrrolidone is colored.

Moreover, when the above organic polar solvent is used, a solvent which does not lower transparency of a resulting polyimide such as a poor solvent such as ethanol, toluene, benzene or xylene, or a good solvent such as dioxane or tetrahydrofuran (hereinafter referred to as THF) can be used together with the organic polar solvent so long as solubility of the resulting polyamide acid is not lowered, and they can be used alone or in an admixture thereof. However, it is preferable that the amount of the solvent such as the poor solvent or the good solvent used together with the organic polar solvent is less than 50% by weight, more preferably at most 30% by weight, of the total amount of the organic polar solvent and the solvent such as the poor solvent or the good solvent, because when a large amount of the poor solvent and the good solvent is used, there is a tendency that a bad influence is exerted on the solubility of the resulting polyamide acid.

The condensation polymer (polyimide) prepared by the condensation polymerization of the aromatic tetracarboxylic acid dianhydride and the diamino compound can be used alone or in an admixture thereof. It is preferable that the weight average molecular weight of the condensation polymer (polyimide) is from about 10,000 to about 500,000. When the weight average molecular weight is less than the above lower limit, there is a tendency that film-forming property of the condensation polymer and strength of the formed film become low. On the other hand, when the weight average molecular weight exceeds the above upper limit, there is a tendency that forming and processing property of the condensation polymer becomes low.

In the ocular lens material of the present invention, some other condensation polymers (polyimides) can be included as well as the condensation polymer (polyimide) prepared by the condensation polymerization of the aromatic tetracarboxylic acid dianhydride and the diamino compound so long as the obtained ocular lens material does not become opaque or cloudy.

Typical examples of the other condensation polymers (polyimides) are, for instance, polyimides described in, for instance, Japanese Unexamined Patent Publication No. 226359/1988, No. 252159/1988, No. 204672/1989, No. 313058/1989, No. 222960/1991, No. 205050/1991 and No. 220210/1993, U.S. Pat. No. 4,955,900, No. 5,049,156 and No. 5,260,352, and the like, and they can be used alone or in an admixture thereof.

It is preferable that the ocular lens material of the present invention contains the condensation polymer (polyimide) prepared by the condensation polymerization of the monomer mixture comprising the aromatic tetracarboxylic acid dianhydride and the diamino compound in a content of 15% to 100% by weight, more preferably 20% to 100% by weight. When the amount of the above condensation polymer contained in the ocular lens material is too small, there is a tendency that improved effects such as the improvement of heat resistance, oxygen permeability, ultraviolet-ray absorbing property and the like become insufficient.

As a typical method for producing an ocular lens by using the above polyimide, there can be cited, for instance, the following four kinds of methods, and the like.

The first method comprises the following steps.

The above-mentioned polyamide acid solution is spread on a mirror-finished plate such as a glass plate or a stainless steel plate in a prescribed thickness, the plate is gradually heated to a temperature of from 100° to 350° C. and the polyamide acid is dehydrated for ring-closure and its imidation is carried out to give a polyimide film. The necessary sheets of the obtained polyimide films are overlapped one on another to give a plate for molding having a predetermined thickness and the obtained plate for molding is subjected to a heat compression molding at a temperature of 200° to 500° C., under a pressure of from 0.5 to 10 t/cm$^2$ for about 0.1 to about 10 hours to give a transparent molding of the polyimide. The obtained transparent molding is subjected to a mechanical process by means of an apparatus such as a cutting apparatus or a grinding apparatus to form an ocular lens.

It is possible that the heating of the polyamide acid solution and the removing of the organic polar solvent from the solution are continuously carried out so as to dehydrate the polyamide acid for ring-closure and carry out its imidation. Moreover, it is possible that the polyamide acid solution is heated and the organic polar solvent is removed from the solution under reduced pressure in an atmosphere of an inert gas.

Also, as an another method for forming the above polyimide film, there can be cited, for instance, a method comprising spreading the polyamide acid solution on a glass plate, heating the plate at a temperature of from 100° to 150° C. for about 30 to about 120 minutes to form a membrane, dipping the membrane in a benzene solution of pyridine and acetic anhydride to remove the solvent and conduct the polyamide acid to imidation, and forming the membrane into a polyimide film, and the like.

The second method comprises the following steps.

The polyamide acid solution is added to a poor solvent for the polyamide acid such as water or methanol to reprecipitate the polyamide acid, and the polyamide acid is collected. Then, the polyamide acid is dehydrated for ring-closure by heating at a temperature of from 100° to 350° C., conducted to imidation and pulverized to give a powdered polyimide. The obtained powdered polyimide is subjected to a heat compression molding at a temperature of from 200° to 500° C. under a pressure of from 0.5 to 10 t/cm$^2$ for about 0.1 to about 10 hours in the same manner as in the above first method to give a transparent molding of the polyimide. The obtained transparent molding of the polyimide is subjected to a mechanical process in the same manner as in the above first method to give an ocular lens.

In the second method, as another method for preparing the polyimide in a state of powder, there can be cited, for instance, a method comprising heating the polyamide acid solution at a temperature of from 100° to 200° C. with stirring, converting the polyamide acid to a polyimide and collecting the polyimide as a precipitate from the system, and the like. In this method, there is an advantage that it is possible to subject the polyimide to a heat compression molding only after washing and drying the polyimide.

The third method comprises directly producing a transparent molding of the polyimide from the polyamide acid not by subjecting a polyimide film or a powdered polyimide to a heat compression molding as in the above first method or the above second method but by subjecting an obtained transparent molding of the polyimide to a mechanical process in the same manner as in the above first method to give an ocular lens.

When the conventional drying method is used, it is difficult to produce a homogeneous molding of the polyimide having a thickness of at least 150 μm because it is impossible to prevent the polyamide acid solution from foaming during drying. However, since it is employed in the third method that the polyamide acid solution is allowed to stand for a long period of time under reduced pressure and the solution is heated from the inside by means of far infrared rays, microwave or the like, it is possible to prepare a molding of the polyimide having a thickness of at least 500 μm without foaming. In other words, a homogeneous molding of the polyimide can be directly produced from the polyamide acid by means of far infrared rays, microwave or the like.

The fourth method comprises the following steps.

According to the fourth method, acetic anhydride, and pyridine or triethylamine are added to the polyamide acid solution, the polyamide acid contained in the solution is conducted to imidation to give a polyimide solution, and the obtained polyimide solution is added to a poor solvent for the polyimide such as water or methanol to reprecipitate the polyimide. The obtained polyimide is filtrated, washed and dried to give a powdered polyimide. Then, the obtained powdered polyimide is added to a good solvent for the polyimide to give a polyimide solution, and the polyimide solution is cast to give a polyimide film.

Furthermore, in the above-mentioned four methods, it is possible that at least two kinds of the moldings of the polyimide or the powdered polyimides are dissolved in the good solvent for the polyimide again to give a solution and the solution is cast to form a polyimide film.

In the above four methods, as a method for producing an ocular lens by mechanically processing the molding of the polyimide, there can be cited, for instance, a method comprising grinding a curved surface of the molding of the polyimide in accordance with the fitting power of a lens to give an ocular lens, and the like. When the polyimide film is formed, an ocular lens can be produced by providing the inside of a mold having a shape corresponding to a contact lens, an intraocular lens or the like with the polyimide film and molding the polyimide film. In this case, the obtained ocular lens can be subjected to a mechanical finishing process if necessary.

An intraocular lens, as an example of the above ocular lenses, can be produced by means of a method comprising producing a hole for fixing parts of the intraocular lens and uniting the fixing parts with the intraocular lens at the hole by spot heating.

There are no limitations of the shape of the fixing parts of the intraocular lens, and these shapes can be adjusted in accordance with their desired shapes. As the material of the fixing parts, there can be cited, for instance, polypropylene, polyvinylidene fluoride, polymethyl methacrylate, and the like. The material of the fixing parts used in the present invention is not particularly limited to the exemplified ones. Moreover, in the present invention, the material of the fixing parts and that of lens parts of the intraocular lens may be the same or different.

Furthermore, in the present invention, as mentioned above, an intraocular lens can be produced not by using a method comprising producing the lens parts and the fixing parts separately and thereafter uniting the lens parts with the fixing parts but by molding lens parts and fixing parts which are united in a body. The intraocular lens produced by molding the lens parts and the fixing parts which are united in a body can be preferably used because there are no jointed portions of the lens parts and the fixing parts in the intraocular lens and it is possible to prevent the detachment of the fixing parts from the lens parts.

The ocular lens material of the present invention is more specifically described and explained by means of the following Examples. It is to be understood that the present invention is not limited to the Examples, and various changes and modifications may be made in the invention without departing from the spirit and scope thereof.

Example 1

The atmosphere of a 500 ml separable flask equipped with a dropping funnel, a tube for introducing nitrogen gas, a mechanical stirrer and a calcium chloride cylinder was replaced with dried nitrogen gas.

The separable flask was charged with 22.2 g (0.05 mole) of diphenylhexafluoroisopropylidenetetracarboxylic acid dianhydride (hereinafter referred to as 6FDA) represented by the formula:

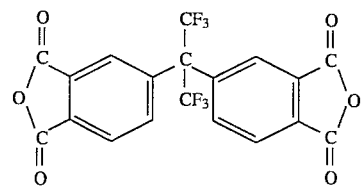

and 70 g of N,N-dimethylacetamide (hereinafter referred to as DMAc). While stirring the mixture in the separable flask at room temperature, a mixed solution of 15.5 g (0.05 mole) of 1,4-bis(3-aminopropyldimethylsilyl)benzene represented by the formula:

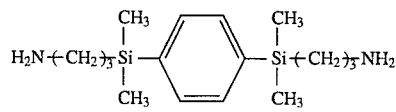

and 50 g of DMAc was added dropwise with the dropping funnel to the separable flask to give a polyamide acid solution.

To the polyamide acid solution, 30.6 g (0.3 mole) of acetic anhydride and 15.8 g (0.2 mole) of pyridine were added with stirring. Then, the mixture in the separable flask was stirred for about 10 hours to give a polyimide solution.

To a 5 l beaker, about 1 l of methanol was added as a poor solvent. While stirring the methanol with a stirrer, about a half amount of the polyimide solution (about 100 g) was added dropwise with the dropping funnel to the beaker to give a polyimide in a state of powder.

The powdered polyimide was filtrated with a Nutsche and pulverized with a pulverizer to give polyimide particles.

The polyimide particles were added to a 1 g beaker and washed with about 500 ml of methanol with stirring on a water bath at 50° C. After 20 minutes passed, the polyimide particles were filtrated, washed once again and dried in a vacuum drier at 90° C. to give a powdered polyimide.

A plate having a thickness of 4 mm was obtained by means of compression molding of the powdered polyimide.

Also, the powdered polyimide was dissolved in 1,4-dioxane. The resulting solution was spread on a glass plate to form a membrane. The membrane was heated at 90° C. for about 16 hours under vacuum to dry and cooled to room temperature to give a film having a thickness of 0.2 mm.

As the physical properties of the powdered polyimide, the plate or the film, film-forming property, refractive index, glass transition temperature, oxygen permeability, weight average molecular weight and ray transmittance (visible-ray transmittance and ultraviolet-ray transmittance) were examined in accordance with the following methods. The results are shown in Table 1.

(A) Film-forming property

The powdered polyimide after drying was dissolved in 1,4-dioxane. The resulting solution was cast on a glass plate to give a film. Transparency and strength of the obtained film were evaluated in accordance with the following criteria for evaluation.

Criteria for evaluation

A: Transparence is observed with naked eyes. No fragility when bending and high strength are observed.

B: Transparence is observed with naked eyes. Some fragility when bending and a little small strength are observed.

C: Opacity or cloudiness is observed with naked eyes, and/or film is not formed.

(B) Refractive index

A test piece having a thickness of 4 mm was obtained from the plate. The refractive index ($n^{25}D$) of the test piece was measured by means of a Abbe's refractometer commercially available from ATAGO CO., LTD. under the trade name of 1-T under the conditions that the temperature is 25° C. and the relative humidity is 50%.

(C) Glass transition temperature

As an index of heat resistance, the glass transition temperature of the powdered polyimide was measured under the following conditions.

Measuring apparatus: DSC/200 and SSC/5200H commercially available from Seiko Instruments Inc.

Rate of increasing temperature: 20° C./min.

Amount of sample: about 10 mg

Reference: α-alumina powder in the same amount of the sample (D) Oxygen permeability The film was cut and ground to give a test piece having a thickness of 0.2 mm. The oxygen permeability of the test piece dipped in a physiological saline at 35° C. was measured by means of a Seikaken-type film oxygen-gas permeater commercially available from RIKASEIKI KOGYO CO., LTD.

The value of oxygen permeability listed on Table 1 means a value when the original value of the oxygen permeability is multiplied by $10^{11}$, and the unit of the value is ml (STP)·cm/(cm²·sec·mmHg).

(E) Weight average molecular weight

The weight average molecular weight of the powdered polyimide was measured under the following conditions.

Measuring apparatus:

HPLC: JASCO Trirotor III commercially available from Japan Spectroscopic Co., Ltd.

RI: 830-RI commercially available from Japan Spectroscopic Co., Ltd.

Column: KF-804 commercially available from SHOWA DENKO K.K.

Solvent: tetrahydrofuran

Flow rate: 1 ml/min

Temperature of the column: 40° C.

The value of the weight average molecular weight listed on Table 1 means a value when the original value of the weight average molecular weight multiplied by $10^{-4}$.

(F) Ray transmittance

The film was cut and ground to give a test piece having a thickness of 0.2 mm. Using a UV-3100 automatic recording spectrophotometer commercially available from SHIMADZU CORPORATION, a ray having a region of wavelength from 780 nm to 190 nm was irradiated to the test piece dipped in distilled water at 20° C. Each ray transmittance of a visible region (wavelength: 780 to 380 nm) and an ultraviolet region (wavelength: 340 nm) was measured.

Example 2

A powdered polyimide, a plate and a film were obtained in the same manner as in Example 1 except that distilled water was used instead of methanol as a poor solvent and the remained half amount of the polyimide solution obtained in Example 1 (about 100 g) was added dropwise with the dropping funnel to the 5 l breaker to give a polyimide in a state of powder. The physical properties thereof were examined in the same manner as in Example 1. The results are shown in Table 1.

Example 3

The atmosphere of a 500 ml separable flask equipped with a dropping funnel, a tube for introducing nitrogen gas, a mechanical stirrer and a calcium chloride cylinder was replaced with dried nitrogen gas.

The separable flask was charged with 22.2 g (0.05 mole) of 6FDA and 60 g of DMAc. While stirring the mixture in the separable flask at room temperature, a mixed solution of 12.5 g (0.05 mole) of 1,3-bis(3-aminopropyl)tetramethyldisiloxane represented by the formula:

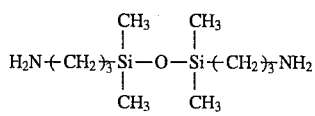

and 40 g of DMAc was added dropwise with the dropping funnel to the separable flask to give a polyamide acid solution.

To the polyamide acid solution, 30.6 g (0.3 mole) of acetic anhydride and 15.8 g (0.2 mole) of pyridine were added with stirring. Then, the mixture in the separable flask was stirred for about 10 hours to give a polyimide solution.

To a 5 l beaker, about 2 l of distilled water was added as a poor solvent. While stirring the distilled water with a stirrer, the polyimide solution was added dropwise with the dropping funnel to the beaker to give a polyimide in a state of powder.

The powdered polyimide was filtrated with a Nutsche and pulverized with a pulverizer to give polyimide particles.

The polyimide particles were added to a 1 l beaker and washed with about 500 ml of distilled water with stirring on a water bath at. 50° C. After 20 minutes passed, the polyimide particles were filtrated, washed once again and dried in a vacuum drier at 80° C. to give a powdered polyimide.

The powdered polyimide was dissolved in 1,4-dioxane. The resulting solution was cast on a glass plate, and the glass plate was allowed to stand for a week to form a membrane. The membrane was heated with a vacuum drier at 80° C. to give a film having a thickness of 0.2 mm.

As a result, the obtained film had a mechanical strength tolerable for grinding.

As the physical properties of the powdered polyimide or the film, film-forming property, glass transition temperature, oxygen permeability, weight average molecular weight and ray transmittance (visible-ray transmittance and ultraviolet-ray transmittance) were examined in the same manner as in Example 1. Also, refractive index and machinability were examined in accordance with the following methods. The results are shown in Table 1.

(G) Refractive index

The film was cut, and the cut films were laminated to give a test piece having a thickness of 4 mm. The refractive index ($n^{25}D$) Of the test piece was measured by means of a Abbe's refractometer commercially available from ATAGO CO., LTD. under the trade name of 1-T under the conditions that the temperature is 25° C. and the relative humidity is 50%.

(H) Machinability The film was cut, and the section thereof was observed with naked eyes. The machinability was evaluated in accordance with the following criteria for evaluation.

Criteria for evaluation
A: Cutting is easily carried out and high gloss is observed in the section.
B: Cutting is easily carried out, and a little high gloss is observed in the section.
C: Cutting is difficult and a little or less gloss is observed.
D: Cutting is impossible.

Example 4

There was used a polyimide mixture (I) of 30% by weight of a polyimide having a recurring unit represented by the formula:

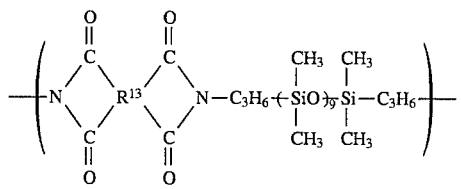

wherein $R^{13}$ is a group represented by the formula:

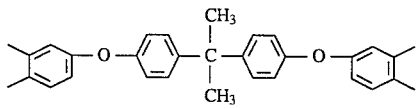

and 70% by weight of a polyimide having a recurring unit represented by the formula:

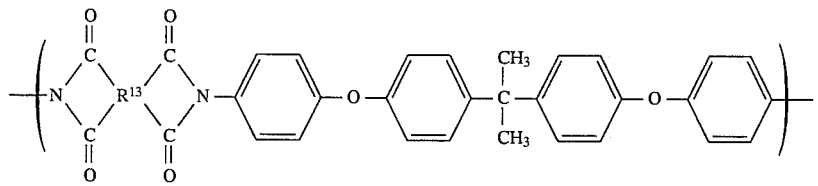

wherein $R^{13}$ is as defined above.

A 20% by weight ethylene glycol dimethyl ether solution of the polyimide mixture (I) was cast on a glass plate and allowed to stand for a week at room temperature to form a polyimide film having a thickness of about 2 mm.

The polyimide film was pulverized by a pulverizer to give a powdered polyimide.

The polyimide film was gouged out with a punch to give a film having a diameter of 15 mm, and the film was cut and ground so that its thickness could be 0.2 mm.

As the physical properties of the powdered polyimide or the film, film-forming property, refractive index, glass transition temperature, oxygen permeability, ray transmittance (visible-ray transmittance and ultraviolet-ray transmittance) and machinability were examined in the same manner as in Example 3. The results are shown in Table 1.

Example 5

A film was obtained in the same manner as in Example 1 except that a polyimide mixture (II) of 30% by weight of a polyimide having a recurring unit represented by the formula:

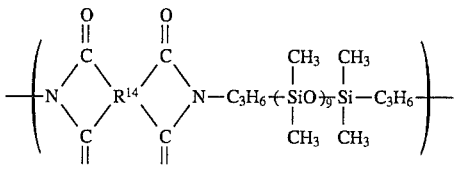

wherein $R^{14}$ is a group represented by the formula:

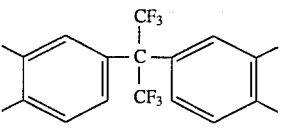

and 70% by weight of a polyimide having a recurring unit represented by the formula:

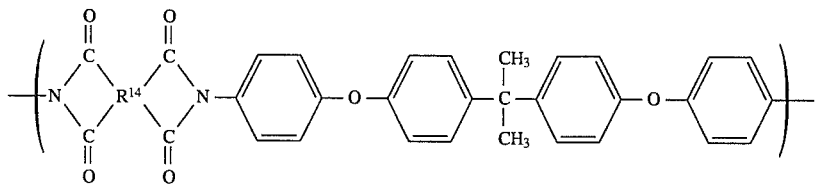

wherein $R^{14}$ is as defined above was used instead of the polyimide mixture (I).

The physical properties of the powdered polyimide or the film were examined in the same manner as in Example 4. The results are shown in Table 1.

Example 6

The atmosphere of a 500 ml separable flask equipped with a dropping funnel, a tube for introducing nitrogen gas, a mechanical stirrer and a calcium chloride cylinder was replaced with dried nitrogen gas.

The separable flask was charged with 22.2 g (0.05 mole) of 6FDA and 70 g of DMAc. While stirring the mixture in the separable flask at room temperature, 7.5 g (0.05 mole) of 2,4-diamino-1,3,5-trimethylbenzene was added dropwise with the dropping funnel to the separable flask to give a polyamide acid solution.

To the polyamide acid solution, 26.8 g (0.26 mole) of acetic anhydride and 26.8 g (0.34 mole) of pyridine were added with stirring. Then, the mixture in the separable flask was stirred for about 24 hours to give a polyimide solution.

To a 5 l beaker, about 3.5 l of methanol was added as a poor solvent. While stirring the methanol with a stirrer, the polyimide solution was added dropwise with the dropping funnel to the beaker to give a polyimide in a state of powder.

The powdered polyimide was finely pulverized to give fine particles by means of a pulverizer, washed with a large amount of methanol and dried under vacuum at 150° C. to give powdered polyimide.

The powdered polyimide was dissolved in 1,4-dioxane. The resulting solution was spread on a glass plate to form a membrane.. The membrane was heated at 130° C. for 16 hours under vacuum to dry and gradually cooled to room temperature to give a film having a thickness of 0.2 mm.

As the physical properties of the powdered polyimide or the film, film-forming property, oxygen permeability, weight average molecular weight and ray transmittance (visible-ray transmittance and ultraviolet-ray transmittance) were examined in the same manner as in Example 3. Also, glass transition temperature was measured in accordance with the following method. The results are shown in Table 1.

(I) Glass transition temperature

As an index of heat resistance, the glass transition temperature of the powdered polyimide was measured in accordance with the following conditions.

Measuring apparatus: Dynamic mechanical analyzer commercially available from Rheometrics Far East LTD. under the trade name of RSA-II Rate of increasing temperature: 3° C./min Range of temperature in measuring: room temperature to 450° C.

Example 7

A powdered polyimide and a film were obtained in the same manner as in Example 6 except that 8.9 g (0.02 mole) of 6FDA was used instead of 22.2 g, that 2.7 g (0.018 mole) of 2,4-diamino-1,3,5-trimethylbenzene was used instead of 7.5 g (0.05 mole) and that 1.8 g (0.002 mole) of a silicon-containing diamine represented by the formula:

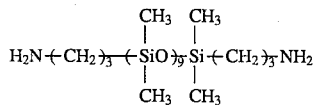

was added to the 2,4-diamino- 1,3,5-trimethylbenzene. The physical properties thereof were examined in the same manner as in Example 6. The results are shown in Table 1.

Example 8

The atmosphere of a 500 ml separable flask equipped with a dropping funnel, a tube for introducing nitrogen gas, a mechanical stirrer and a calcium chloride cylinder was replaced with dried nitrogen gas.

The separable flask was charged with 8.9 g (0.02 mole) of 6FDA and 48.5 g of DMAc. While stirring the mixture in the separable flask at room temperature, 7.3 g (0.02 mole) of 2,2-bis(3-amino-4-methylphenyl)hexafluoropropane was added to the separable flask to give a polyamide acid solution.

To the polyamide acid solution, 10.7 g (0.11 mole) of acetic anhydride and 10.7 g (0.13 mole) of pyridine were added with stirring. Then, the mixture in the separable flask was stirred for about 24 hours to give a polyimide solution.

To a 1 l beaker, about 500 ml of methanol was added as a poor solvent. While stirring the methanol with a stirrer, the polyimide solution was added dropwise with the dropping funnel to the beaker to give a polyimide in a state of powder.

The powdered polyimide was finely pulverized to give fine particles, washed with a large amount of methanol and dried under vacuum at 80° C. to give a powdered polyimide.

The powdered polyimide was dissolved in 1,4-dioxane. The resulting solution was spread on a glass plate to form a membrane. The membrane was heated at 70° C. for 16 hours under vacuum to dry and gradually cooled to room temperature to give a film having a thickness of 0.2 mm.

As the physical properties of the powdered polyimide or the film, film-forming property, glass transition temperature, oxygen permeability, weight average molecular weight and ray transmittance (visible-ray transmittance and ultraviolet-ray transmittance) were measured in the same manner as in Example 6. Also, machinability was measured in the same manner as in Example 3. The results are shown in Table 1.

Example 9

A powdered polyimide and a film having a thickness of 0.2 mm were obtained in the same manner as in Example 8 except that 7.3 g (0.02 mole) of 2,2-bis(3-amino-4-hydroxyphenyl)hexafluoropropane was used instead of 7.3 g (0.02 mole) of 2,2-bis(3-amino-4-methylphenyl)hexafluoropropane. The physical properties thereof were examined in the same manner as in Example 8. The results are shown in Table 1.

Example 10

A powdered polyimide and a film having a thickness of 0.2 mm were obtained in the same manner as in Example 8 except that 6.4 g (0.02 mole) of 2,2-bis(trifluoromethyl)benzidine was used instead of 7.3 g (0.02 mole) of 2,2-bis(3-amino-4-methylphenyl)hexafluoropropane. The physical properties thereof were examined in the same manner as in Example 8. The results are shown in Table 1.

Example 11

A powdered polyimide and a film having a thickness of 0.2 mm were obtained in the same manner as in Example 8 except that 7.0 g (0.02 mole) of 9,9-bis(4-aminophenyl)fluorene was used instead of 7.3 g (0.02 mole) of 2,2-bis(3-amino-4-methylphenyl)hexafluoropropane. The physical properties thereof were examined in the same manner as in Example 8. The results are shown in Table 1.

Example 12

A powdered polyimide and a film having a thickness of 0.2 mm were obtained in the same manner as in Example 8 except that 6.6 g (0.0 18 mole) of 2,2-bis-( 3-amino-4-methylphenyl)hexafluoropropane was used instead of 7.3 g (0.02 mole) and 1.8 g (0.002 mole) of a silicon-containing diamine represented by the formula:

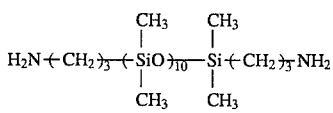

was added to the 2,2-bis(3-amino-4-methylphenyl)hexafluoropropane. The physical properties thereof were examined in the same manner as in Example 8. The results are shown in Table 1.

Example 13

A powdered polyimide and a film having a thickness of 0.2 mm were obtained in the same manner as in Example 8 except that 6.3 g (0.0 18 mole) of 9,9-bis(4-aminophe-

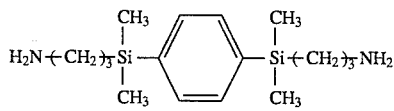

was added to the 2,2-bis(3-amino-4-methylphenyl)hexafluoropropane. The physical properties thereof were examined in the same manner as in Example 8. The results are shown in Table 1.

TABLE 1

| Example No. | Film-forming property | Refractive index (−) | Glass transition temperature (°C.) | Oxygen permeability | Weight average molecular weight | Ray transmittance (%) | | Machinability |
| --- | --- | --- | --- | --- | --- | --- | --- | --- |
| | | | | | | Visible-ray transmittance | Ultraviolet-ray transmittance | |
| 1 | A | 1.56 | 130 | 2 | 5.4 | 90≦ | 0 | — |
| 2 | A | 1.56 | 123 | 1.8 | 5.4 | 90≦ | 0 | — |
| 3 | A | 1.63 | 103 | 9.3 | 1.2 | 90≦ | 0 | A |
| 4 | A | 1.54 | 120 | 23 | — | 85≦ | 0 | A |
| 5 | A | 1.56 | 150 | 22 | — | 85≦ | 0 | A |
| 6 | A | — | 410 | 30 | 9.8 | 90≦ | 0 | — |
| 7 | A | — | 200≦ | 60 | 16 | 90≦ | 0 | — |
| 8 | A | — | 292 | 9 | 5.8 | 85≦ | 0 | B |
| 9 | A | — | 263 | 2 | 4.0 | 85≦ | 0 | B |
| 10 | A | — | 340 | 7 | 11.7 | 85≦ | 0 | B |
| 11 | A | — | 392 | 9 | 7.7 | 85≦ | 0 | B |
| 12 | A | — | 276 | 9 | 6.2 | 85≦ | 0 | A |
| 13 | A | — | 354 | 12 | 5.8 | 85≦ | 0 | A |
| 14 | A | — | 240 | 6 | 5.0 | 85≦ | 0 | A | nyl)fluorene was used instead of 7.3 g (0.02 mole) of 2,2-bis(3-amino-4-methylphenyl)hexafluoropropane and 1.8 g (0.002 mole) of a silicon-containing diamine represented by the formula:

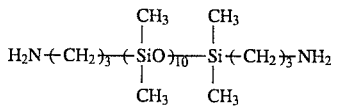

was added to the 9,9-bis(4-aminophenyl)fluorene. The physical properties thereof were examined in the same manner as in Example 8. The results are shown in Table 1.

Example 14

A powdered polyimide and a film having a thickness of 0.2 mm were obtained in the same manner as in Example 8 except that 5.8 g (0.0 16 mole) of 2,2-bis(3-amino-4-methylphenyl)hexafluoropropane was used instead of 7.3 g (0.02 mole) and 1.2 g (0.004 mole) of a silicon-containing diamine represented by the formula:

Generally, polyimides have red brown color and opacity.

However, as is clear from the results of Examples 1 to 14 shown in Table 1, the polyimides obtained in these Examples have high visible-ray transmittance of at least 85% and are excellent in transparency and film-forming property because the aromatic tetracarboxylic acid dianhydride is used as a component of the present invention.

Also, as is clear from the results shown in Table 1, the polyimides obtained in Examples 1 to 14 have high oxygen permeability. The polyimides also have excellent forming and processing property because the polyimides have sufficient strength and high machinability. Furthermore, the polyimides have high glass transition temperature and excellent heat resistance. The polyimides also have excellent ultraviolet-ray absorbing property because the ultraviolet-ray transmittance is 0%.

Accordingly, the polyimides are desirable for an ocular lens material.

Although the polyimides obtained in Examples 1 to 5 have a refractive index lower than usual polyimides, each of these polyimides has high refractive index suitable for an ocular lens material since each of these polyimides contains a silicon atom in its molecule.

The polyimides obtained in Examples 6 to 14 especially have high glass transition temperature and excellent heat resistance because the diamino-substituted benzene and the diamino-substituted diphenyl are used as a diamino compound.

The ocular lens material of the present invention is particularly excellent in oxygen permeability, heat resistance, ultraviolet-ray absorbing property and forming and processing property as well as transparency. Accordingly, the ocular lens materials of the present invention are particularly useful for contact lenses and intraocular lenses.

In addition to the ingredients used in the Examples, other ingredients can be used in the Example as set forth in the specification to obtain substantially the same results.

What is claimed is:

1. A transparent ocular lens material comprising a condensation polymer prepared by the condensation polymerization of (A) an aromatic tetracarboxylic acid dianhydride represented by the general formula (I):

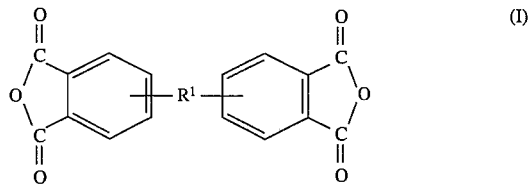
(I)

wherein $R^1$ is , -CO-, -CH$_2$-, -C(CH$_3$)$_2$-, -C(CF$_3$)$_2$- or a group represented by the general formula:

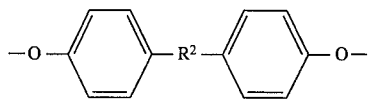

in which $R^2$ is -C(CH$_3$)$_2$- or -C(CF$_3$)$_2$- and (B) a diamino compound selected from (a) a silicon-containing diamine represented by the general formula (II):

$$H_2N-R^3-NH_2 \quad (II)$$

wherein $R^3$ is a group represented by the general formula:

in which l is an integer of 1 to 3, m is an integer of 1 to 15 and n is an integer of 1 to 3, a group represented by the general formula:

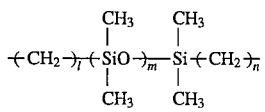

in which p is an integer of 1 to 10, a group represented by the general formula:

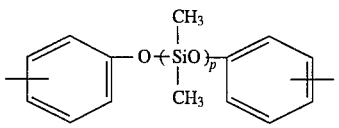

in which q is an integer of 1 to 3, r is an integer of 1 to 10 and s is an integer of 1 to 3, a group represented by the general formula:

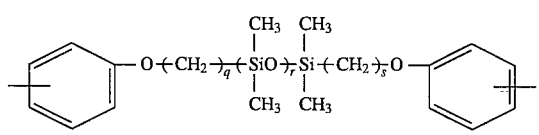

in which t is an integer of 1 to 10, or a group represented by the general formula:

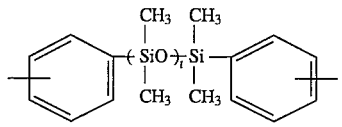

in which u is an integer of 1 to 3 and v is an integer of 1 to 3;

(b) a diamino-substituted benzene represented by the general formula (III):

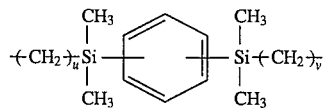
(III)

wherein $R^4$, $R^5$, $R^6$ and $R^7$ are the same or different and each is hydrogen atom or an alkyl group having 1 to 5 carbon atoms and (c) a diamino-substituted diphenyl represented by the general formula (IV):

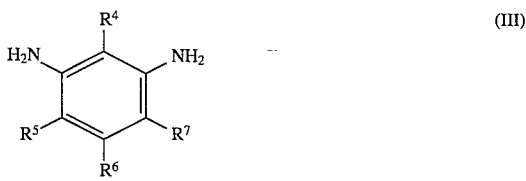
(IV)

wherein $R^8$ is -C(CH$_3$)$_2$-, -C(CF$_3$)$_2$-, -O-, a group represented by the formula:

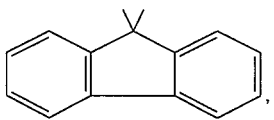

in which $R^{11}$ is -SO$_2$-, -C(CH$_3$)$_2$- or -C(CF$_3$)$_2$-, or a direct and $R^9$ and $R^{10}$ are the same or different and each is an alkyl group having 1 to 3 carbon atoms, a fluoroalkyl group having 1 to 3 carbon atoms, hydrogen atom, hydroxyl group or carboxyl group.

2. The ocular lens material of claim 1, wherein said aromatic tetracarboxylic acid dianhydride (A) is a compound represented by the general formula:

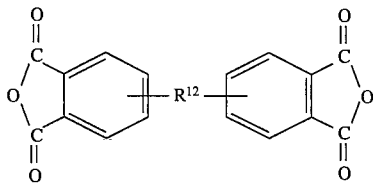

wherein $R^{12}$ is -C(CH$_3$)$_2$-, -C(CF$_3$)$_2$-, a group represented by the formula:

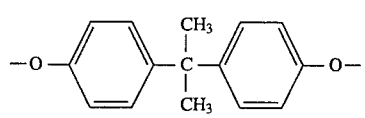
or a group represented by the formula:
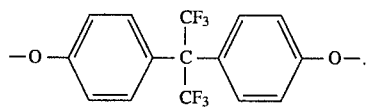
3. The ocular lens material of claim 1, which contains said condensation polymer in a content of 15% to 100% by weight.
4. The ocular lens material of claim 1, wherein the molar ratio of at least one of said diamino-substituted benzene (b) and said diamino-substituted diphenyl (c) said silicon-containing diamine (a) is at least 70/30.
* * * * *